US010410673B2

(12) United States Patent
Balko

(10) Patent No.: US 10,410,673 B2
(45) Date of Patent: Sep. 10, 2019

(54) EMBEDDABLE VIDEO CAPTURING, PROCESSING AND CONVERSION APPLICATION

(71) Applicant: CLIPCHAMP IP PTY LTD, Enoggera Qld (AU)

(72) Inventor: Soeren Balko, Indooroopilly (AU)

(73) Assignee: CLIPCHAMP IP PTY LTD, Enoggera Qld (AU)

( * ) Notice: Subject to any disclaimer, the term of this patent is extended or adjusted under 35 U.S.C. 154(b) by 0 days.

(21) Appl. No.: 14/924,599

(22) Filed: Oct. 27, 2015

(65) Prior Publication Data

US 2016/0117159 A1    Apr. 28, 2016

Related U.S. Application Data

(60) Provisional application No. 62/069,331, filed on Oct. 28, 2014.

(51) Int. Cl.
*G06F 3/00* (2006.01)
*G11B 27/031* (2006.01)
*G06F 9/54* (2006.01)
*H04N 5/76* (2006.01)
*G06F 9/445* (2018.01)

(52) U.S. Cl.
CPC ........ *G11B 27/031* (2013.01); *G06F 9/44526* (2013.01); *G06F 9/54* (2013.01); *H04N 5/76* (2013.01)

(58) Field of Classification Search
CPC .. G06F 7/78; G06F 8/00–78; G06F 9/44–455; G06F 11/36; G06F 9/54
USPC ........................................................ 719/310
See application file for complete search history.

(56) References Cited

U.S. PATENT DOCUMENTS

| | | | | |
|---|---|---|---|---|
| 2007/0083527 A1* | 4/2007 | Wadler | ............... | G06F 17/30852 |
| 2008/0163283 A1* | 7/2008 | Tan | .................. | H04N 7/163 725/20 |
| 2009/0077471 A1* | 3/2009 | Lahr | ................. | G06F 17/30799 715/748 |
| 2009/0199242 A1* | 8/2009 | Johnson | .................. | G06F 16/70 725/46 |
| 2010/0042682 A1* | 2/2010 | Kaye | .................... | G11B 27/034 709/203 |
| 2011/0161485 A1* | 6/2011 | George | ............... | H04L 65/4069 709/224 |
| 2012/0016862 A1* | 1/2012 | Rajan | .................. | G06F 11/3684 707/710 |

(Continued)

OTHER PUBLICATIONS

Richard, Browser Plugins vs Extensions, 2010 (Year: 2010) pp. 1-12.*
Sapna Blesson, Video Conferencing Tool. (Year: 2009).*

*Primary Examiner* — Lechi Truong
(74) *Attorney, Agent, or Firm* — Neugeboren O'Dowd PC

(57) ABSTRACT

An embeddable video capturing, processing and conversion application for embedding a video capturing, processing, and conversion application component into third-party applications such as Web applications running in Web browsers or mobile applications running on mobile computing devices. The embeddable video capturing, processing and conversion application generally includes a client computing device 10, a code location 20, an application location 30, a video source location 40, a video target location 50, an application outlet 60, and an embeddable video capturing, processing, and conversion application 70.

17 Claims, 5 Drawing Sheets

(56) References Cited

U.S. PATENT DOCUMENTS

| | | | | |
|---|---|---|---|---|
| 2012/0023084 A1* | 1/2012 | Lalji | ................... | G06F 17/3002 |
| | | | | 707/706 |
| 2012/0131686 A1* | 5/2012 | Risan | ..................... | G06F 21/10 |
| | | | | 726/32 |
| 2013/0104024 A1* | 4/2013 | Rajkumar | ............... | G06F 16/70 |
| | | | | 715/234 |
| 2014/0279182 A1* | 9/2014 | Goodman | .......... | G06Q 30/0621 |
| | | | | 705/26.5 |
| 2014/0337611 A1* | 11/2014 | Kuscher | ............... | G06F 9/4401 |
| | | | | 713/100 |
| 2015/0286489 A1* | 10/2015 | Brown, Jr. | ......... | G06Q 30/0621 |
| | | | | 717/178 |

* cited by examiner

EMBEDDABLE VIDEO CAPTURING, PROCESSING AND CONVERSION APPLICATION

CROSS-REFERENCE TO RELATED APPLICATIONS

This application claims the benefit of U.S. Provisional Application No. 62/069,331, filed 28 Oct. 2014.

BACKGROUND OF THE INVENTION

The present invention relates generally to video conversion buttons and more specifically it relates to an embeddable video capturing, processing and conversion application for embedding a video capturing, processing, and conversion application component into third-party applications such as Web applications running in Web browsers or mobile applications running on mobile computing devices.

BRIEF SUMMARY OF THE INVENTION

The invention generally relates to a video conversion button which includes a client computing device 10, a code location 20, an application location 30, a video source location 40, a video target location 50, an application outlet 60, and an embeddable video capturing, processing, and conversion application 70.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide an embeddable video capturing, processing and conversion application for embedding a video capturing, processing, and conversion application component into third-party applications such as Web applications running in Web browsers or mobile applications running on mobile computing devices.

Another object is to provide an Embeddable Video Capturing, Processing And Conversion Application that provides video capturing, processing, and conversion services to a specific external, third-party application (such as a Web application running in a Web browser or a mobile application running on mobile computing devices), where the publisher, vendor, or creator of the external, third-party application embeds program code into the external, third-party application.

Another object is to provide an Embeddable Video Capturing, Processing And Conversion Application that provides video capturing, processing, and conversion services to all external, third-party applications (such as Web applications running in a Web browser or mobile applications running on mobile computing devices), where the user (owner, operator, administrator) of the underlying client computing device (such as a mobile computing device) and the contained application container (such as a Web browser) installs an application extension providing video capturing, conversion, and processing services and where this application extension automatically injects video capturing, processing, and conversion functionality into external, third-party applications, having existing video handling functionality, such as a file upload widget where users can upload video files to the application's server-side component.

Another object is to provide an Embeddable Video Capturing, Processing And Conversion Application that provides a graphical user interface component (such as a clickable button widget, popup windows, and other user interface element), which becomes part of the user interface of the third-party, external application.

Another object is to provide an Embeddable Video Capturing, Processing And Conversion Application that provides a configuration interface and an application programming interface, where the external, third-party application or the underlying computing platform can configure and invoke video capturing, processing, or conversion services.

Another object is to provide an Embeddable Video Capturing, Processing And Conversion Application that offers a configurable graphical user interface component that is shown during a long-running video capturing, processing, or conversion service invocation and can be configured to display advertisements, engage the user in interactive games, playback videos, or perform other actions, including output of non-visual content, such as audio.

Another object is to provide an Embeddable Video Capturing, Processing And Conversion Application that where the video capturing, processing and conversion application can run on different computing resources, including (1) a local client computing device that runs the underlying computing platform (e.g., the computing device running the Web browser that presents a Web application to the end user), (2) other client computing devices (such as client computing devices in the same local area network as the client computing device running the computing infrastructure), (3) one or a plurality of server computer(s) which may be based in a (Cloud-based) data center, (4) distributed computing infrastructure, such as in Grid computing or Hive computing or (5) any other computing infrastructure suitable for running video capturing, conversion, and processing application code.

Another object is to provide an Embeddable Video Capturing, Processing And Conversion Application that can retrieve videos from a variety of sources, including local capturing devices such as Web cameras, video cameras and microphones built into mobile devices, screen capturing interfaces that record the successive visual changes on a computer screen (or portions thereof), the file system of a local computing device, Cloud-based data storage services, peer-to-peer connections to other client computing devices, connected video and audio capturing devices (such as dedicated cameras and microphones that are separate from the local computing device), video and audio playback elements that play back videos (or audio) inside the external third-party application that the video capturing, processing and conversion application is embedded into, and other data sources that are suitable to retrieve video streams and files from (including remote locations).

Another object is to provide an Embeddable Video Capturing, Processing And Conversion Application that may entail video transcoding services implementing a workflow of steps where a video in a given input format is transformed into a video in an output format, where parameters such as the resolution (such as standard definition, high definition, ultra high definition, etc.), aspect ratio (such as 4:3, 16:9, etc.), frame rate (such as 30, 60, 120, etc. frames per second), codecs (such as ADVANCED VIDEO CODING [H.264], GOOGLE VP8, ADVANCED AUDIO CODEC [AAC], FRAUNHOFER MP3, etc.), container (such as APPLE QUICKTIME, MPEG-4, WEBM, etc.), bit rate (number of bits per second of video) and other parameters may be altered to suit different purposes such as being compatible for playback on a particular playback device, being compressed into a smaller file size, being automatically edited into a shorter-length video sequence, etc.

Another object is to provide an Embeddable Video Capturing, Processing And Conversion Application that can send an output video progressively ("streaming") or in a single step to any suitable target location, which may be a local destination (such as some storage device or interface that is local to the client computing device, a video playback software or device, and other local destinations suitable to receive a video file or stream) or a remote destination that are connected to the local client computing device through a network (such as another client computing device that received the video file on a peer-to-peer connection, a server computer that may reside in a Cloud data center, a Web service that may represent a public end point exposed by some external Web application such as a video content management service or any other remote location suitable to receive a video file or stream).

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 is a block diagram illustrating the overall of the present invention. FIG. 1 (100) depicts the principal overall architecture of the invention, comprising a client computing device 10 being run by an end user 12 and providing an application container 11; a code location 20 from where the embeddable video capturing, processing, and conversion application 70 code can be retrieved; an application location 30 that is operated by an application publisher 32 and from where the external application 31 can be retrieved; a video source location 40 and a video target location from where input video files or streams can be retrieved and to which output video files or streams can be forwarded, respectively; an application outlet 60, which is a directory of application extensions such as the embeddable video capturing, processing, and conversion application 70 and which is accessed by the end user 12 or application publisher 32 to browse, search, and find application extensions that are subsequently integrated into the application container 11 (which may for instance be a World Wide Web browser) or into the external application 31 (which may for instance be a client-side World Wide Web application or a mobile application); and an embeddable video capturing, processing, and conversion application 70 that runs within the application container 11 and integrates into the external application 31 that may be simultaneously run by the application container 11.

FIGS. 2A and 2B in combination are a flowchart illustrating a sub-operation of the present invention. FIGS. 2A and 2B depict a flow chart 200 of steps performed by an embodiment of the invention where the embeddable video capturing, processing, and conversion application 70 may be an extension to the application container 11 (which may, for instance, be a World Wide Web browser or any other extensible application container infrastructure), where the end user 12 of a client computing device 10 retrieves the embeddable video capturing, processing, and conversion application 70 from an application outlet 60, which may for instance be a directory of World Wide Web browser extensions, such as the GOOGLE CHROME WEB STORE, the MOZILLA FIREFOX MARKETPLACE, the APPLE SAFARI EXTENSIONS directory, etc.

FIGS. 3A and 3B in combination are a flowchart illustrating the overall operation of the present invention. FIGS. 3A and 3B depict a flow chart 300 of steps that may generally be performed by the invention. Specifically, flow chart 300 illustrates a procedure that may be performed when an end user 12 (or any other trigger) causes the application container 11 to retrieve an external application 31 from the application location 30, the application container 11 subsequently loads the embeddable video capturing, processing, and conversion application 70 from the code location 20, and the external application 31 configures the embeddable video capturing, processing, and conversion application 70. Subsequently, either the end user 12 may trigger a user interface widget (such as a button) of the application interface 71 or the external application 31 programmatically triggers the application interface 71. As a result of the previous steps, flow chart 300 may then receive an input video file or stream from the video source location 40 and the user interface 72 may then (optionally) capture additional video conversion or processing parameters from the end user 12. Finally, the processing component 73 processes or converts the previously received input video file or stream, producing an output video file or stream, which is sent to the video target location 50.

DETAILED DESCRIPTION OF THE INVENTION

A. Overview

Figure 1:
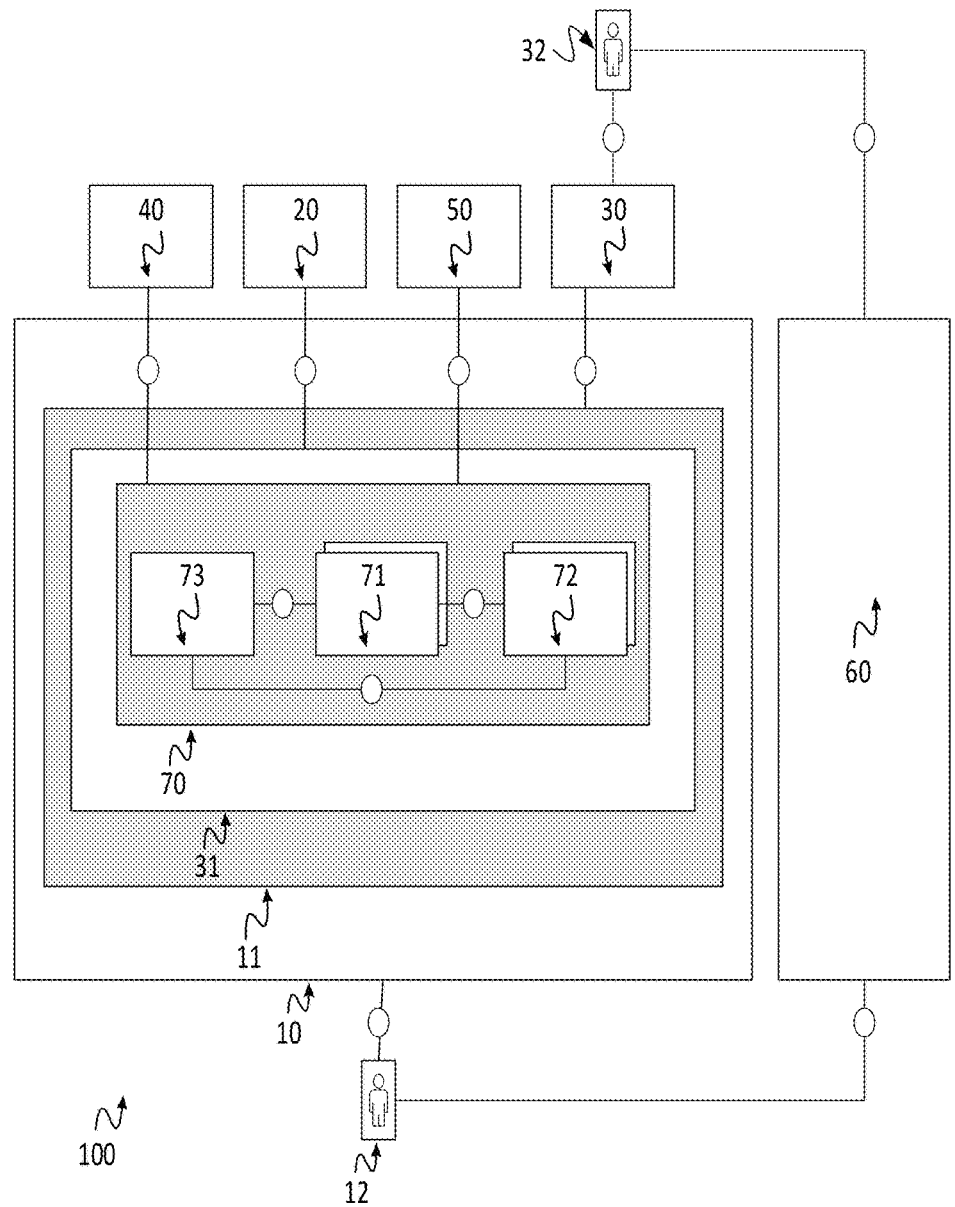
FIG. 1.

Turning now descriptively to the drawings, in which similar reference characters denote similar elements throughout the several views, the figures illustrate a client computing device 10, a code location 20, an application location 30, a video source location 40, a video target location 50, an application outlet 60, and an embeddable video capturing, processing, and conversion application 70.

B. Client Computing Device

The client computing device 10 is an end user computing device such as a laptop, notebook, desktop computer, workstation, tablet, smartphone, smart watch or any other end user computing device, which is suitable to run software applications such as the external applications 31 received from an application location 30 and the embeddable video capturing, processing, and conversion application 70. The client computing device further provides an application container 11, which provides the runtime environment for the applications 31 and 70. The client computing device 10 is operated by an end user 12, which may be a person or a machine operating the client computing device 10 through suitable interfaces.

The client computing device 10 represents an end-user 12 operated computing device, which is suitable to run software applications such as the external application 31 and the embeddable video capturing, processing, and conversion application 70 inside an application container 11. That is, the client computing device 10 may be a generically programmable computing device comprising hardware (or virtualized) components such as for instance a central processing unit, main memory, storage, a network interface, etc. The client computing device 10 may be specifically suitable to run external applications 31 supporting a workflow where an end user 12 may select an input video from a video source 40, which may be subsequently transferred to a video destination 50.

The client computing device 10 may be a computing device in a broad sense, which encompasses a variety of computing devices like workstations, personal computers, laptops, notebooks, personal digital assistants, smartphones, tablet computers, smart watches and other wearable computing devices, etc. The application container 11 may be a generic runtime environment for applications (e.g. a Web browser, an operating system, an application server, etc.).

C. Code Location

The code location 20 is a storage component that is either local to the client computing device 10 (such as a local storage device) or remote from the client computing device 10 (such as a remote server, which is accessible over a network such as the Internet), which provides the application code of the embeddable video capturing, processing, and conversion application 70. For example, the code location 20 may be a Web server that is accessible from the Internet and is suitable to deliver application code to applications 31 and 70 running inside an application container 11 on the client computing device 10. In another embodiment of the invention, the code location 20 may be a local storage device such as a database or file system that is part of the client computing device 10 and which may permanently store (or temporarily cache) application code 31 and 70.

The code location 20 represents the primary storage location of the embeddable video capturing, processing, and conversion application 70, which provides an interface (such as a network interface) to retrieve a copy of the video capturing, processing, and conversion application 70 for embedding it into an external application 31 that is instantiated inside the application container 11.

In one embodiment of the invention, the code location 20 may be a World Wide Web server, which may deliver a copy of the embeddable video capturing, processing, and conversion application 70 through standard network protocols such as HYPERTEXT TRANSFER PROTOCOL (HTTP). In another embodiment of the invention, the code location 20 may be a cache storage device such as a World Wide Web browser cache that is local to an application container 11, which may be a World Wide Web browser. In another embodiment of the invention, the code location 20 may be a repository of software that is installed locally on the client computing device 10, such as user-installed World Wide Web browser extensions.

D. Application Location

The application location 30 is another storage component that is either local to the client computing device 10 or remote from the client computing device 10. The application location 10 stores and upon request delivers an application 31 to the application container 11. Upon receipt from the application location 30, the application container 11 instantiates and runs the application 31. The application location is operated by an application publisher 32, which may be an organizational entity such as a single person, a company, an organizational department, etc. In an alternative embodiment of the invention where the application location 30 is the client computing device 10 itself, the application publisher 32 may be identical to the end user 12.

The application location 30 represents the primary storage location of an external application 31, such as a World Wide Web application. The application location 30 provides an interface (such as a network interface) accessible by the application container 11 to retrieve a copy of the external application 31, which is later instantiated within the application container 11.

In one embodiment of the invention, the application location 30 may be a World Wide Web server, which may deliver a copy of the external application 31 through standard network protocols such as HYPERTEXT TRANSFER PROTOCOL (HTTP). In another embodiment of the invention, the application location 30 may be a cache storage device such as a World Wide Web browser cache that is local to the application container 11, which may be a World Wide Web browser. In another embodiment of the invention, the application location 30 may be a repository of software that is installed locally on the client computing device 10, such as a user-installed World Wide Web browser application or an installed mobile application, etc.

E. Video Source Location

The video source location 40 is another remote or local component that may provide a video or audio file or stream to the applications 31 and 70. For example, the video source location 40 may be a digital camera that is built into the client computing device 10 or otherwise connected to it. In another embodiment of the invention, the video source location 40 may further be a storage device that is local to the client computing device 10, which stores video files. In another embodiment of the invention, the video source location 40 may be a video player component, which plays videos on the client computing device 10 that may also serve as the input for the embeddable video capturing, processing, and conversion application. In another embodiment of the application, the video source 40 may be a remote location such as a Cloud-based storage service from which video files can be retrieved. In another embodiment of the invention, the video source location 40 may be another client computing device 10, which is different from the local client computing device and from where video files or streams can be received through suitable protocols such as peer-to-peer network protocols like WORLD WIDE WEB CONSORTIUM (W3C) WEBRTC.

The video source location 40 represents the source of an input video file or stream that is received by the embeddable video capturing, processing, and conversion application 70.

The video source location 40 may be associated with a storage where the input video file or stream is temporarily or permanently stored on a suitable storage device. Alternatively, the video source location 40 may be another technical component, which merely receives an input video file or stream from another source and which may perform some operation on the input video file or stream, such as playing back that video file or stream, applying effects on that input video file or stream, transporting that input video file or stream over a communication infrastructure or network such as the Internet, etc.

In one embodiment of the invention, the video source location 40 may be a storage device such as a hard disk, solid state drive, random access memory, optical disk drive, etc. that is local to a client computing device 10. As a variant to the aforementioned embodiment, the storage device may be associated with interfaces such as a database interface, a file system, a Web service interface etc., suitable to retrieve a video file or stream. In another embodiment of the invention, the video source location may be a video or audio capturing device (such as a camera or microphone) that is local or communicatively connected to the client computing device 10. In another embodiment of the invention, the video source location 40 may be an application programming interface allowing to retrieve a video file or stream from another source that is local to the client computing device 10 such as a continuous capture of the computer screen. In another embodiment of the invention, the video source location 40 may be a video or audio playback device or software, from which the video or audio that is displayed or played may be captured. In another embodiment of the invention, the video source location 40 may be a World Wide Web service or a plurality of World Wide Web services suitable to retrieve a video file or stream from a remote location, such as a server computer connected to the client computing device through a network such as the Internet. As a variant to the aforementioned embodiment, the server computer may be part of a computing infrastructure of a video content management system such as YOUTUBE or VIMEO or a Cloud-based file storage service, such as DROPBOX or AMAZON S3. In another embodiment of the invention, the video source location 40 may be another client computing device 10, which is different from the local client computing device. The other client computing device may be communicatively coupled with the local client computing device through a suitable network protocol and underlying network infrastructure such as a peer-to-peer connection established by network protocols such as REAL-TIME STREAMING PROTOCOL (RTSP) over a dial-up connection such as ASYNCHRONOUS DIGITAL SUBSCRIBER LINE (ADSL). In one embodiment of the invention, the video source location 40 may provide a progressive interface, where the input video file or stream may be continuously retrieved in small data packets.

F. Video Target Location

The video target location 50 is another remote or local component that can receive a video or audio file or stream from the embeddable video capturing, processing, and conversion application 70. For example, the video target location 50 may be a remote (Cloud-based) storage service, which stores the output video file. In another embodiment of the invention, the video target location 50 may be a video or audio player, which plays back the output video file or stream. In another embodiment, the video target location may be a video content management service (such as YOUTUBE or VIMEO), which provides video storage, distribution, and playback services to the Internet. In a further embodiment of the invention, the video target location 50 may be a local storage device on the client computing device 10, such as the local file system. In another embodiment of the invention, the video target location 50 may be another client computing device 10, which is different from the local client computing device, where the connection to the local client computing device is established through a suitable network protocol.

The video target location 50 represents the destination of an output video file or stream that is produced by the embeddable video capturing, processing, and conversion application 70. The video target location 50 may be associated with a storage where the output video file or stream is temporarily or permanently stored on a suitable storage device such as a hard disk drive, a solid state drive, etc. Alternatively, the video target location 50 may be another technical component, which merely temporarily holds all of or portions of an output video file and then discards it or forwards it to another technical component. While temporarily holding all of or portions of the output video file or stream, the video target location 50 may perform operations on the input video file or stream such as playback or transporting the output video file or stream to another destination over a suitable communication infrastructure, such as the Internet.

In one embodiment of the invention, the video target location 50 may be a storage device that is local to a client computing device 10, such as a hard disk drive, solid state drive, tape, random access memory and a software layer on top, such as a database system or a file system. In another embodiment of the invention, the video target location 50 may be a video or audio playback software or device, suitable to display and playback a video file or stream. In another embodiment of the invention, the video target location 50 may be a video content management system, represented by Web services for video upload on the Internet such as provided by YOUTUBE, FACEBOOK, VIMEO and others. In another embodiment of the invention, the video target location 50 may be another client computing device 10, suitable to receive all of or portions of an output video file or stream over a suitable communication infrastructure such as the Internet and using suitable application programming interfaces such as WORLD WIDE WEB CONSORTIUM (W3C) WEBRTC and network protocols such as REAL-TIME STREAMING PROTOCOL (RTSP). In an embodiment of the invention, the video target location 50 may support a progressive interface, where an output video file or stream can be continuously transferred in small data packets.

G. Application Outlet

The application outlet 60 is a directory or repository service, which is suitable to list and distribute applications, such as the embeddable video capturing, processing, and conversion application 70. In an embodiment of the invention, the application outlet may be a generic Web service on the Internet that can be indexed from Internet-wide search engines such as GOOGLE, MICROSOFT BING and others and from which the embeddable video capturing, processing, and conversion application 70 can be retrieved by means of standard protocols such as HTTP. In another embodiment of the invention, the application outlet 60 may be an app store such as the APPLE APP STORE, the GOOGLE PLAY STORE, the MICROSOFT WINDOWS app store and others, targeting specific target devices and operating systems. In another embodiment of the invention, the application outlet 60 may be a Web browser extension registry such as the GOOGLE CHROME WEB STORE, the APPLE SAFARI extensions directory, the MOZILLA FIREFOX MARKETPLACE or any other Web browser extension directory. In another embodiment of the invention, the application outlet 60 may be a plugin directory for content management service technologies such as WORDPRESS, DRUPAL, JOOMLA, MICROSOFT SHAREPOINT and others. In a further embodiment of the invention, the application outlet may be an extension registry for application frameworks such as JQUERY, NODE. JS, RUBY ON RAILS, GRAILS, DJANGO and others.

The application outlet 60 represents a directory where the embeddable video capturing, processing, and conversion application code 70 and accompanying documentation is stored and made accessible for end users 12 and/or application publishers 32. An end user 12 may access the application outlet 60 to find and install the embeddable video capturing, processing, and conversion application into the application container 11 or its client computing device 10. The application publisher 32 may access the application outlet 60 to find and install the embeddable video capturing, processing and conversion application 70, which is then manually or automatically embedded into the external application 31, which is operated or managed by the application publisher 32.

In one embodiment of the invention, an end user 12 installs the embeddable video capturing, processing, and conversion application 70 from an application outlet 60 which may be an application store such as the APPLE APP STORE, the GOOGLE PLAY STORE, the MICROSOFT WINDOWS STORE, etc. or a directory of World Wide Web browser extensions such as the GOOGLE CHROME WEB STORE, the MOZILLA FIREFOX MARKETPLACE, the APPLE SAFARI EXTENSIONS Web site, etc. In a variant of the aforementioned embodiment, organizations or people who are different from the end user 12 of a client computing device 10 (such as organizational information technology department personnel) may install the embeddable video capturing, processing, and conversion application 70 on the client computing device 10 using suitable device management software. In another embodiment of the invention, an application outlet 60 which may be a plugin directory for the software infrastructure that is used by an external application 31 may be accessed by an application publisher 32, who may insert the embeddable video capturing, processing, and conversion application 70 into the external application 31 code. In a variant of the invention, the application publisher 32 may merely insert a reference such as a UNIFORM RESOURCE LOCATOR to the code location 20 into the external application 31. Examples for software infrastructures used by external applications 31 include content management software such as WORDPRESS, DRUPAL, JOOMLA, etc., software libraries such as JQUERY, GOOGLE ANGULAR, etc., enterprise portal software such as MICROSOFT SHAREPOINT and SAP PORTAL, on-premise and Cloud-based enterprise applications such as SAP ERP, SALESFORCE FORCE.COM and others.

H. Embeddable Video Capturing, Processing, And Conversion Application

The embeddable video capturing, processing, and conversion application 70 is an application component suitable to run on a client computing device 10 inside the application container 11, and as a supplement to the application 31. The embeddable video capturing, processing, and conversion application 70 entails one or a plurality of embedded application interfaces 71, one or a plurality of user interfaces 72, and a processing component 73.

The embeddable video capturing, processing, and conversion application 70 is a software component located at code location 20, which is suitable to work in conjunction with the external application 31 within the application container 31. The embeddable video capturing, processing, and conversion application implements steps of a digital audio and video handling workflow which may comprise the retrieval of digital audio and video data from a video source location 40, the processing of digital audio and video data, and the forwarding of digital audio and video data to the video target location 50. Processing digital audio and video data may comprise activities such as transcoding digital audio and video data into a different format defined as a combination of parameters such as the used audio and video codecs (e. G., H. 264, VP8, etc.), container format (such as QUICKTIME, MP4, etc.), the aspect ratio (such as 16:9, 4:3, etc.), the bit rate (i.e., the number of bits per second of video), and any other parameter defining the encoding of digital audio and video in a data file or stream. Processing digital audio and video data may further comprise automatically and manually editing one or a plurality of video files, such as concatenating a single video file out of a plurality of input video files; applying visual and sound effects onto the digital video and audio such as for instance color distortions, slow motion, upscaling and downscaling to a different resolution, and applying any other signal processing algorithm suitable to process digital audio or video for different purposes. The embeddable video capturing, processing, and conversion application 70 may interact with the external application 31 in order to invoke the embeddable video capturing, processing, and conversion application 70 with an input video file or stream provided by the external application 31 and receiving an output video file or stream from the embeddable video capturing, processing, and conversion application, where the external application 31 may connect the embeddable video capturing, processing, and conversion application 70 to the video source location 40 and the video target location 50. The embeddable video capturing, processing, and conversion application 70 is subdivided into three major components, being an embedded application interface 71, a user interface 72, and a processing component 73. The embedded application interface 71 comprises an application programming interface as well as a visual interface which directly integrates into the program code or user interface of the external application 71. For instance, the embedded application interface 71 may be a button widget that becomes part of the external application's 31 user interface. Alternatively, the external application 31 may directly invoke an application programming interface of the embedded application interface 71. The user interface 72 is the collection of dedicated user interfaces (such as popup windows, screens, voice commands, etc.) which are used by the embeddable video capturing, processing and conversion application 70 to interact with the end user 12. For instance, the user interface 72 may comprise a file browser to present selectable input video files from a video source location 40, which may be a local file system. User interface 12 may further provide visual controls for providing feedback, such as showing status information about performing any of the video capturing, processing, and conversion activities. Finally, the processing component 73 may implement the core video capturing, processing, and conversion application logic, which may entail a video and audio file transcoding software, including video and audio codec libraries, a video analysis software and further signal processing and digital audio and video algorithms.

In one embodiment of the invention, the embeddable video capturing, processing and conversion application 70 may integrate with the external application 31 by replacing existing functionality or plugging into extension interfaces by means of late binding mechanisms. For example, an embeddable video capturing, processing and conversion application 70, which is a World Wide Web browser extension application may integrate with an external application, which is a client-side Web application written in JavaScript and HYPERTEXT MARKUP LANGUAGE (HTML) by replacing existing HTML markup for input controls that allow for uploading video files to the video target location 50 with invocations of the embeddable video capturing, processing, and conversion application 70 such that in effect, a simple video file upload to the video target location 70 is replaced by a more complex workflow involving some video processing steps such as video transcoding or video compression. In a variant of the aforementioned embodiment, the previous video source location 40, which may be the local file system of the client computing device 10 may be augmented with an additional video source location 40, which may be the camera and microphone of the client computing device 10. In another embodiment of the invention where the embeddable video capturing, processing, and conversion application 70 may be a software library such as a JAVASCRIPT library retrieved from an application outlet 60, which may be a directory of JAVASCRIPT libraries, the application publisher 32 of an external application 31, which may be a client-side Web application may use features of the embeddable video capturing, processing, and conversion application 70 to develop an external application 31 using these features. The embeddable video capturing, processing, and conversion application 70 may be a software application implemented in any programming language and using any application programming interfaces suitable to run in an application container 11. For instance, the embeddable video capturing, processing and conversion application 70 may be implemented using JAVASCRIPT, GOOGLE PORTABLE NATIVE CLIENT, ORACLE JAVA, ADOBE FLASH, MICROSOFT.NET, MICROSOFT SILVERLIGHT or other programming languages and application programming interfaces.

I. Connections of Main Elements and Sub-Elements of Invention

The client computing device 10 contains an application container 11, which is a software infrastructure to run applications such as the external application 31 and the embeddable video capturing, processing, and conversion application 70. The client computing device 10 may be operated by an end user 12, which may be a specific person, a logical user role, a group of people, or a technical component impersonating a person. Specifically, the end user uses and consumes the features provided by the aforementioned applications running in the application container 11.

The code location 20 may be communicatively coupled to the client computing device 10 and any software components therein, such as the application container 11. The code location 20 contains a replica of the embeddable video capturing, processing, and conversion application 70.

The application location 30 may be communicatively coupled to the client computing device 10 and any software components therein, such as the application container 11. The application location 30 contains the external application 31. The application publisher 32 is the person or organizational entity operating, owning, or legally controlling the external application 31 that is provided at the application location 30.

The video source location 40 and the video target location 50 are both communicatively coupled to the application container 11 and the applications running therein, like the external application 31 and the embeddable video capturing, processing, and conversion application 70. Both video source location 40 and video target location 50 may be part of the client computing device 10 or separate from the client computing device 10.

The end user 12 and the application publisher 32 may temporarily access the application outlet 50 through suitable user interfaces like search, browsing, listing interfaces and others, where an end user 12 or an application publisher 32 may retrieve a technical address such as a uniform resource locator (URL) of the embeddable video capturing, processing, and conversion application 70 at the code location 20. The end user 12 and the application publisher 32 may use the aforementioned technical address to retrieve a copy of the embeddable video capturing, processing, and conversion application 70 from the code location 20 for purposes such as installing the embeddable video capturing, processing, and conversion application 70 within the application container 11 or to integrate the embeddable video capturing, processing, and conversion application 70 with the external application 31.

The embeddable video capturing, processing, and conversion application 70 may contain three major components, being an embedded application interface 71, a user interface 72, and a processing component 73. The embedded application interface 71, the user interface 72, and the processing component 73 may be communicatively coupled using suitable communication infrastructure, including network communication protocols such as HYPERTEXT TRANSFER PROTOCOL (HTTP).

J. Alternative Embodiments of Invention

In an alternative embodiment of the invention, the embeddable video capturing, processing, and conversion application may partially or fully run on a computing infrastructure that is different from the local client computing device 10. That is, the application container 11 on the local client computing device 10 only runs a proxy component responsible for communicating with the actual runtime locations of the embeddable video capturing, processing, and conversion application 70. For example, the embeddable video capturing, processing, and conversion application may be running on a remote server, such as a Cloud-provisioned computer, that is communicatively coupled to the client computing device 10 through a suitable communication infrastructure such as the Internet. In an alternative variant of this embodiment, the embeddable video capturing, processing, and conversion application 70 may be running on another client computing device 10, which is different from the local client computing device. For example, a local client computing device 10, which is a World Wide Web browser may connect to another client computing device through suitable communication protocols such as WORLD WIDE WEB CONSORTIUM (W3C) WEBRTC where the other client computing device 10 runs the embeddable video capturing, processing, and conversion application 70 in its application container 11.

In another embodiment of the invention, the embeddable video capturing, processing, and conversion application 70 may be running on a distributed computing infrastructure where all of or portions of the embeddable video capturing, processing, and conversion application 70 are split into separate computing tasks that can run in isolation on different computing resources such as different central processing units (CPUs) or CPU cores of the client computing device 10, remote nodes of a communicatively coupled Grid computing infrastructure, a Hive computing infrastructure where a plurality of other client computing devices 10 each process a task that is a portion of the workload that is to be run by the embeddable video capturing, processing, and conversion application 70. For example, a workload representing a video transcoding job converting an input video file or stream from the video source location 40 into an output video file or stream (having a different format), which may be sent to the video target location, may be split into separate computing tasks where each computing task processes a separate sequence of the input video file or stream.

K. Operation of Preferred Embodiment

The invention proposed in this application implements an embeddable video capturing, processing, and conversion application 70, which may for instance comprise a video transcoding service, a video recording service, a video playback service, a video enhancement service, a video editing service, a video effects service or any other service suitable to capture video from a video source location 40 and process or convert a video in any way, producing an output video file or stream that is sent to a video target location 50. The embeddable video capturing, processing, and conversion application 70 may implement suitable video capturing, processing, and conversion algorithms such as video decoding and encoding algorithms, signal processing algorithms, image processing algorithms and procedures to interface video source locations 40 (such as file systems, databases, remote server computers, World Wide Web services, cameras and microphones, computer screen recording interfaces, etc.) where an input video file or stream is received and procedures to interface video target locations 50 (such as file systems, databases, remote server computers, World Wide Web services, video playback devices and software, etc.) that an output video file or stream (which is produced by the embeddable video capturing, processing, and conversion application 70) is sent to. The embeddable video capturing, processing, and conversion application 70 may be implemented in a programming language and using application programming interfaces suitable to run in an application container 11 (such as a World Wide Web browser (such as GOOGLE CHROME, APPLE SAFARI, MICROSOFT INTERNET EXPLORER, MOZILLA FIREFOX and others), a mobile device operating system such as APPLE IOS, GOOGLE ANDROID, MICROSOFT WINDOWS PHONE, etc.) on a client computing device 10. For example, when the application container 11 is a World Wide Web browser, the embeddable video capturing, processing, and conversion application 70 may be implemented in JAVASCRIPT, HYPERTEXT MARKUP LANGUAGE (HTML) and CASCADING STYLE SHEETS (CSS). In another example where the application container 11 is an APPLE IOS operating system for mobile devices, the embeddable video capturing, processing, and conversion application 70 may be implemented in the OBJECTIVE-C programming language, using the APPLE COCOA TOUCH application programming interfaces. Other examples of common programming languages targeting specific application containers 11 are GOOGLE PORTABLE NATIVE CLIENT (PNaCl) for the GOOGLE CHROME World Wide Web browser, MICROSOFT SILVERLIGHT for the MICROSOFT INTERNET EXPLORER World Wide Web browser, ADOBE ACTIONSCRIPT for ADOBE FLASH plugins of World Wide Web browsers, ORACLE JAVA for GOOGLE ANDROID-based mobile devices, KHRONOS GROUP WEBGL for WEBGL-enabled World Wide Web browsers and other programming languages suitable to implement an embeddable video capturing, processing, and conversion application 70. All of or portions of the embeddable video capturing, processing, and conversion application 70 may be cross-compiled from existing, third-party source code into the aforementioned programming languages. For example, the open source FFMPEG, LIBAV, MPLAYER, VIDEOLAN X264, INTEL OPENCV software libraries may be cross-compiled to build the embeddable video capturing, processing, and conversion application 70. The embeddable video capturing, processing, and conversion application 70 comprises of three major components, being an embedded application interface 71, a user interface 72, and a processing component 73. The embedded application interface 71 may be the software integration layer to the external application 31, using common techniques for integrating different software components (such as offering an application programming interface of callable services and application events that can be subscribed to or code injection technique where the external application 31 is dynamically modified at runtime to invoke services of the embeddable video capturing, processing, and conversion application 70) to provide callable services interfaces to the external application 31 and optionally inserting user interface components such as buttons, voice commands, touch and mouse gestures, keyboard commands, etc. into the user interface of the external application 31. The external application 31 may pass control over to the embeddable video capturing, processing, and conversion application 70 by invoking services of the embedded application interface 71. The user interface 72 provides a suitable user interface to engage the end user 12 in performing video capturing, processing, and conversion services. The user interface may use any suitable technique to interact with the end user 12 such as visual user interface controls (such as buttons, input boxes, etc.), voice output and input commands, touch and mouse gestures, etc. Example services provided by the user interface 72 are displaying progress and status information while the processing component 73 performs a video capturing, processing or conversion job, capturing user-defined parameters to control a video capturing, processing, or conversion job, implementing additional video source locations 40 such as a video recorder accessing cameras or microphones of the client computing device 10, implementing additional video target locations 50 such as a software-based video player, etc. The processing component 73 implements the core video processing and conversion services, such as video transcoding, signal processing, image processing, etc.

The invention further provides for mechanisms to embed and integrate the aforementioned embeddable video capturing, processing, and conversion application 70 into an external application 31, such as a World Wide Web application, an application running on mobile devices or any other software application running on client computing devices, such as personal computers, workstations, laptops, notebooks, smartphones, tablet computers, smart watches, etc. In one embodiment of the invention these integration mechanisms comprise of providing an application programming interface to external applications 31. An application publisher 32, who is the person, organizational entity, or a person or organization affiliated with the application publisher 32 may implement or modify the external application 31 code to integrate to the embeddable video capturing, processing, and conversion application 70 using suitable application integration techniques, such as message passing, service invocation, event subscription, class inheritance, configuration, etc. As a result, the external application 31 may be readily integrated with the embeddable video capturing, processing, and conversion application 70 when it is received at the application container 11 from the application location 30.

Figure 3A:
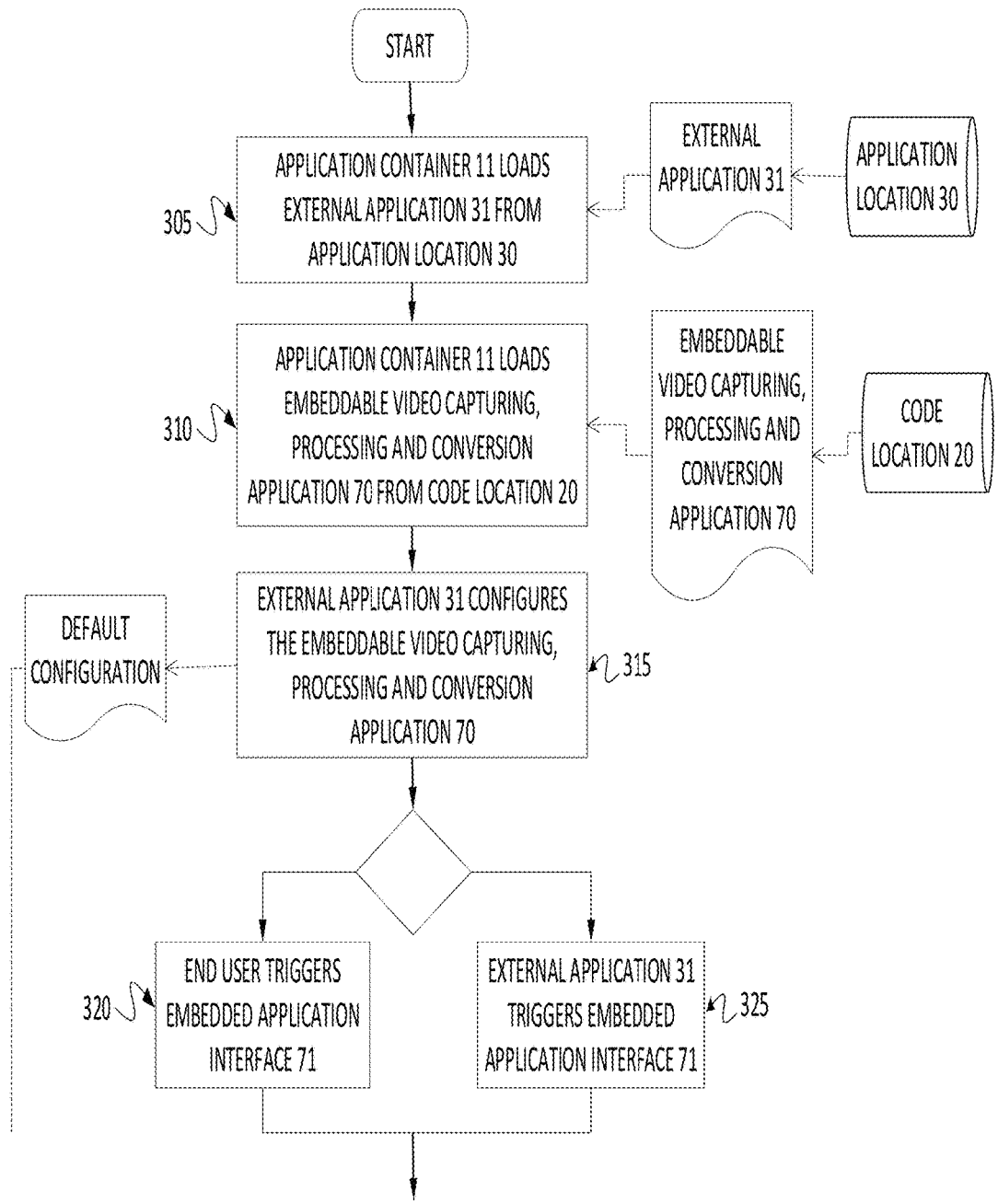
FIGS. 3A and 3B.
Figure 3B:
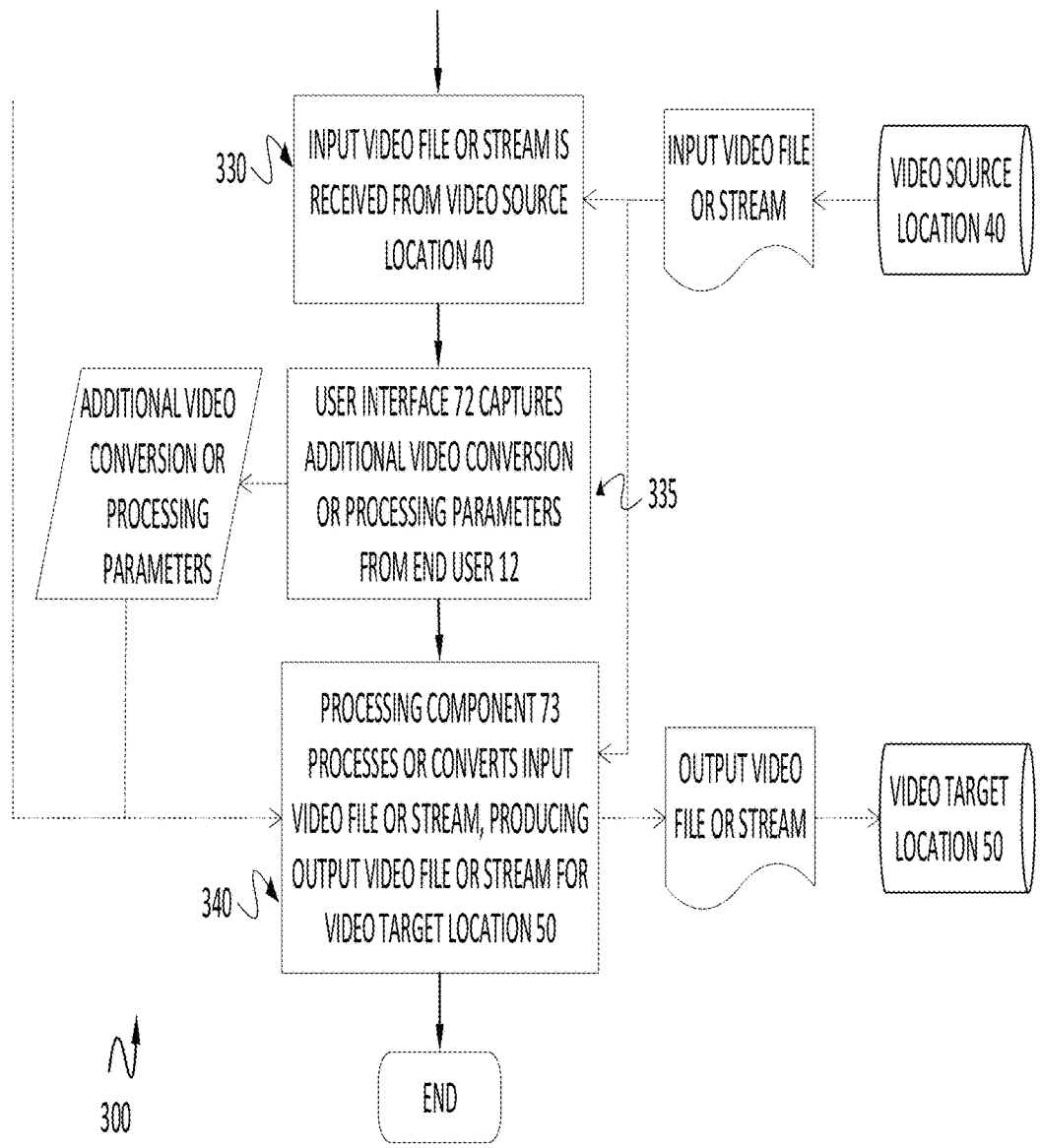

The general procedure of running an external application 31 inside an application container 11 is shown in FIG. 3, which shows a flow chart 300. The procedure may be started from arbitrary external stimuli, such as the end user 12 of the client computing device 10 requesting the external application 31 to be loaded or an automatic mechanism (such as a time-scheduled action, or a request received from an external component) doing so. In step 305, the application container 11 loads the external application 31 from the application location 30. For example, when the application container 11 is a World Wide Web browser and the application location 30 is a World Wide Web server, step 305 corresponds to the application container 11 performing a HYPERTEXT TRANSFER PROTOCOL (HTTP) "GET" request against a UNIFORM RESOURCE LOCATOR (URL) of a World Wide Web server, representing application location 30. When the external application 31, which may be a number of JAVASCRIPT, HYPERTEXT MARKUP LANGUAGE (HTML), CASCADING STYLE SHEET (CSS), etc. resources, was received by the application container 11, it may be parsed and interpreted, thus running the external application 31. In another example, when the application container 11 is an operating system such as APPLE 10S, step 305 corresponds to loading and instantiating a software application that is installed on the client computing device 10 representing the external application 31 from the local device's storage device into main memory and invoking a software routine suitable to launch the application. In step 310, the application container 11 loads and instantiates the embeddable video capturing, processing, and conversion application 70 from the code location 20. Loading and instantiating the embeddable video capturing, processing and conversion application 70 may be triggered by instantiating the external application 31 (step 305), which may include references to the embeddable video capturing, processing, and conversion application 70. For instance, an external application 31, which is a client-side World Wide Web application, may contain suitable commands to retrieve and instantiate the resources that make up the embeddable video capturing, processing, and conversion application 70, such as HYPERTEXT MARKUP LANGUAGE elements that request JAVSSCRIPT files from a World Wide Web server, which may represent code location 20. In step 315, the external application 31 configures the embeddable video capturing, processing, and conversion application 70, such as to determine the appearance and behavior of any user interface components that are part of the embedded application interface 71 or the user interface 72, to select a subset of services to be subsequently consumed, or to parameterize the embeddable video capturing, processing, and conversion application 70 in any other way that may be supported by its application programming interface. Sometime during the course of running the external application 31 and its embedded video capturing, processing, and conversion application 70 and after step 315 was completed, either step 320 or step 325 may be performed. In step 320, the end user 12 may trigger the application interface 71 by interacting with the contained user interface such as clicking or tapping on a button. Alternatively, in step 325 the external application 31 programmatically triggers the application interface 71, such as by invoking a service interface that is part of the application programming interface exposed by the application interface 71. As a result of both step 320 and step 325, in step 330, an input video file or stream may be received from a video source location 40. For instance, in step 320 the end user 12 may have clicked on a button that is part of the embedded application interface 71. As a result a file selection window may have allowed the user to pick an input video file from the local storage device of the client computing device 10. In another embodiment of step 320, a video recording user interface, which may be connected to a camera or microphone of the client computing device 10 may be opened where the end user 12 may record a video or audio file from the aforementioned cameras or microphones. In another example, in step 325 the external application 31 may programmatically invoke the embedded application interface providing an input video file or stream, which was previously received by the external application 31 such as from a remote server like a World Wide Web server. In step 335, the user interface 72 of the embeddable video capturing, processing, and conversion application 70 may (optionally) capture additional parameters for the subsequent invocation of the processing component 73 from the end user 12. For instance, the user interface 72 may be a slider bar, where the end user 12 can control the compression ratio of a video conversion job that is performed by the processing component 73. In another example, other video conversion and processing parameters such as the format of the output video file or stream may be captured using suitable user interface elements, such as graphical widgets for mouse or touch interaction, voice commands, textual input, etc. Finally, in step 340 the processing component 73 of the embeddable video capturing, processing, and conversion application 70 may perform a video capturing, processing, or conversion job, such as video transcoding, video compression, video editing, video enhancement, automatic generation of a video digest, which is a short summary of one or a plurality of input videos. Step 340 consumes the input video file or stream received in step 330, and may use both the default configuration provided by the external application 31 in step 315 and the end user 12 parameters captured in step 335. In step 340, the processing component 73 may produce an output video file or stream that is sent to the video target location 50. The output video file or stream may be produced progressively where only successive portions of the output video file or stream are sent to the video target location 50 or in a single step where the entire output video file or stream is sent to the video target location 50. In one embodiment of the invention, the video target location 50 may be the external application 31 or another run of the embeddable video capturing, processing, and conversion application 70 (or invocations of sub-components or sub-processes of these two applications).

Figure 2A:
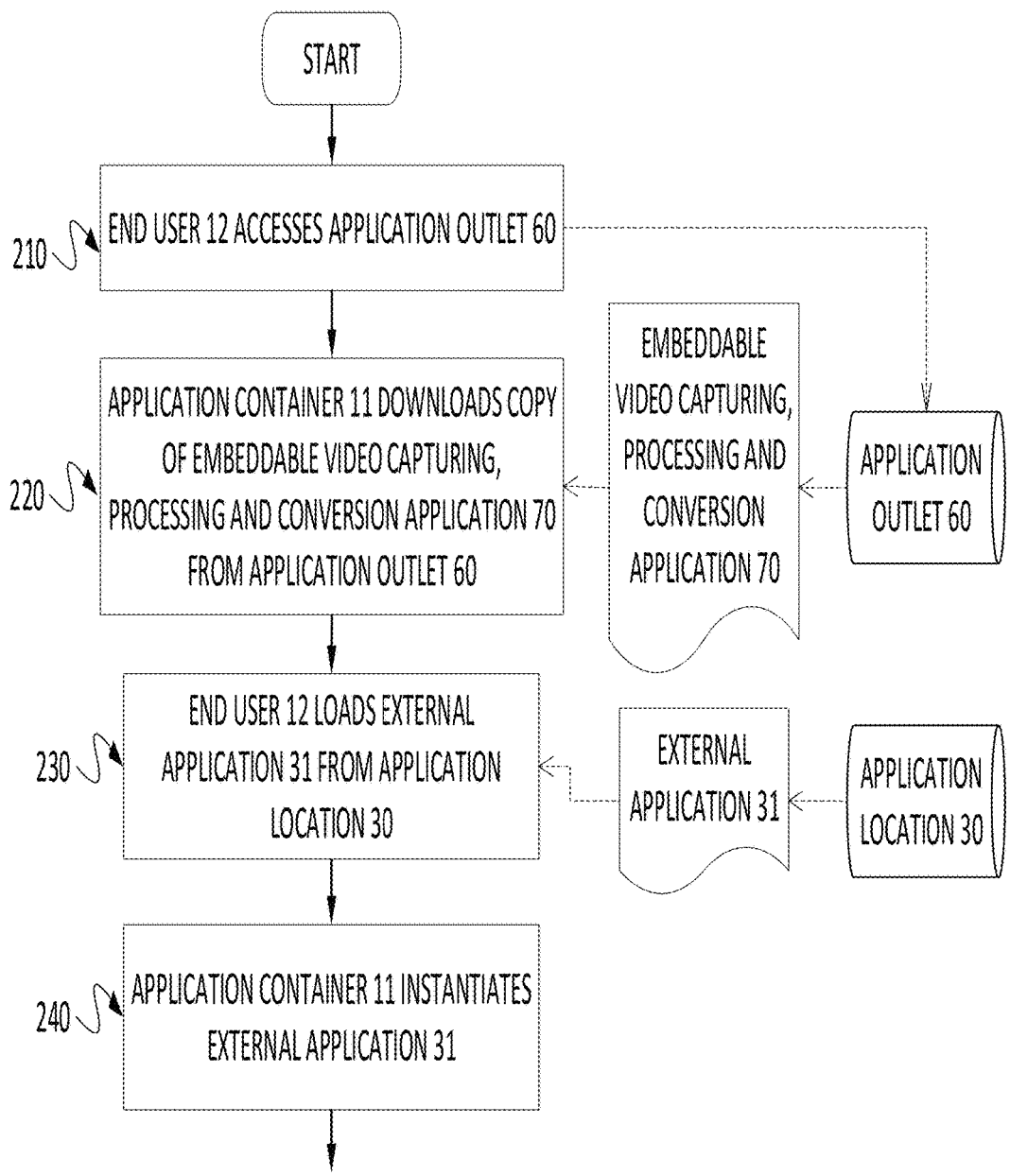
FIGS. 2A and 2B.
Figure 2B:
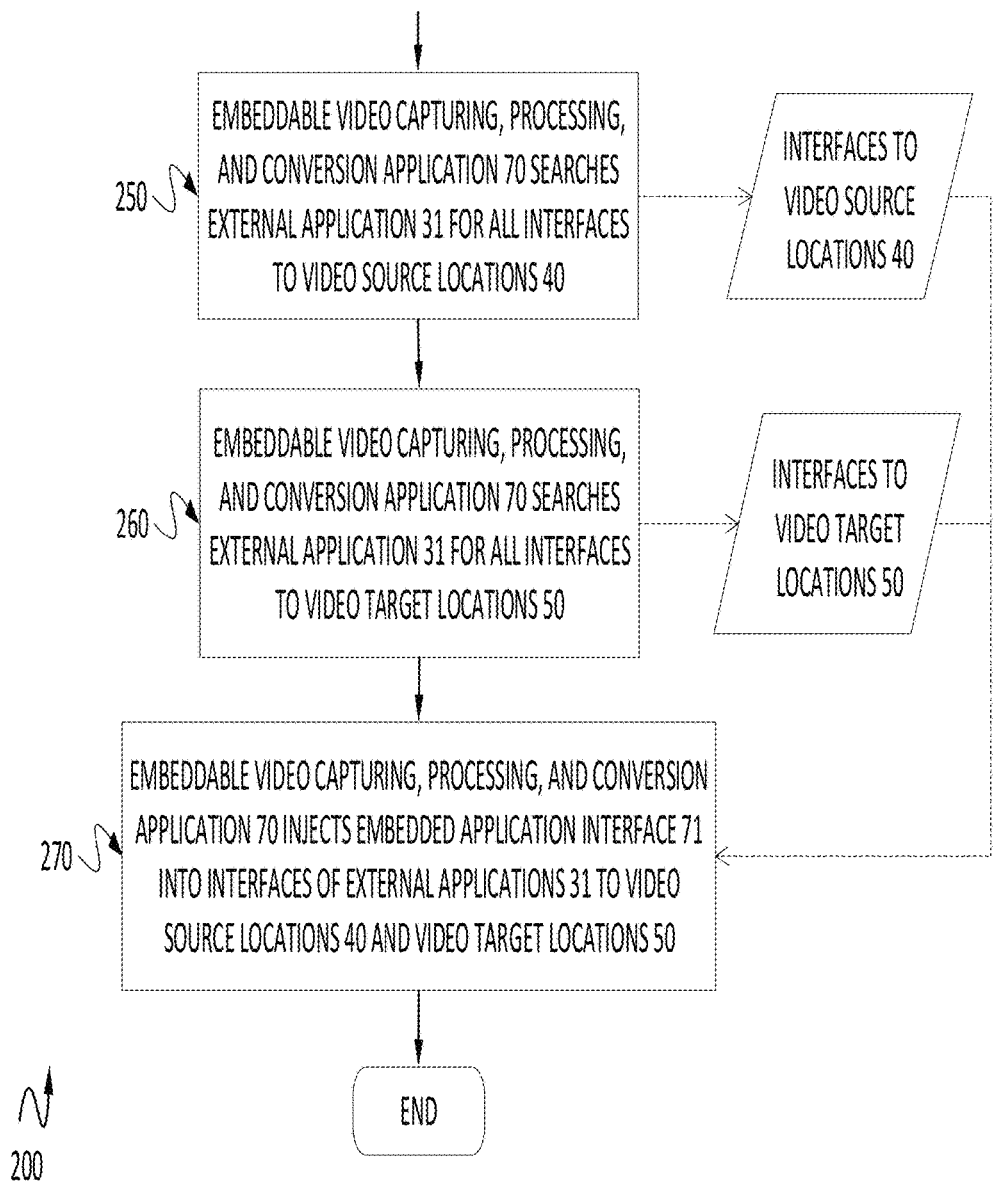

FIG. 2 depicts a flow chart 200, which is an alternative embodiment of the invention where the end user 12 may install the embeddable video capturing, processing, and conversion application 70 into the application container 11 on the client computing device 10. In step 210, the end user 12 accesses the application outlet 60, which may be a digital marketplace or directory of applications suitable to run in the context of an application container 11. For instance, the embeddable video capturing, processing, and conversion application 70 may be a World Wide Web browser extension or plugin, which is listed on application outlets 60, such as the GOOGLE CHROME WEB STORE, the MOZILLA MARKETPLACE, the APPLE SAFARI extensions directory and others. In the context of this example, the application container 11 may be a World Wide Web browser suitable to be functionally extended by suitable applications, such as the embeddable video capturing, processing, and conversion application 70. In step 220, the end user 12 triggers a service of the application container 11, causing it to download a copy of the embeddable video capturing, processing, and conversion application 70 from the application outlet 60. For example, when the application container 11 is a World Wide Web browser, step 220 may correspond to installing a World Wide Web browser extension from a directory of extensions, such as the aforementioned vendor-specific application outlets 60. In another example where the application container 11 may be an operating system of the client computing device 10, such as an operating system running on smartphones, tablets, or other devices, step 220 may correspond to installing an application from an application outlet, which is an application store, such as the GOOGLE PLAY STORE for client computing devices 10 running the GOOGLE ANDROID operating system, the APPLE APP STORE for client computing devices 10 running the APPLE IOS operating system or any other application store providing applications, such as the embeddable video capturing, processing, and conversion application 70 for application containers 11 being operating systems of client computing devices 10. In step 230, the end user 12 triggers the application container 11 to load an external application 31, such as a World Wide Web application, from an application location 30, such as a World Wide Web server. For instance, when application container 11 is a World Wide Web browser such as GOOGLE CHROME, APPLE SAFARI, MOZILLA FIREFOX, MICROSOFT INTERNET EXPLORER, etc., loading an external application 31 may correspond to the application container 11 requesting resources such as JAVASCRIPT, HYPERTEXT MARKUP LANGUAGE (HTML), CASCADING STYLE SHEET (CSS) and other files from an application location 30, which may be a World Wide Web server, serving files over a network such as the Internet using computer network protocols such as HYPERTEXT TRANSFER PROTOCOL (HTTP) and others. In step 240, the application container 11 instantiates and starts the external application 31. For example, when the application container 11 is a World Wide Web browser and the external application 31 is the aforementioned collection of resources retrieved from an application location 30, which may be a World Wide Web server, instantiating the external application 31 may correspond to parsing and interpreting script and markup resources such as JAVASCRIPT, HYPERTEXT MARKUP LANGUAGE, CASCADING STYLE SHEET files and others. In steps 250 and 260, the embeddable video capturing, processing, and conversion application 70, which was installed in step 220, may be triggered in the context of the external application 31 that was loaded and instantiated in steps 230 and 240. That is, the embeddable video capturing, processing, and conversion application 70 may identify all interfaces of the external application 31 to video source locations 40 (step 250) and video target locations 50 (step 260). For example, when the application container 11 is a World Wide Web browser and the external application 31 is a client-side World Wide Web application out of HYPERTEXT MARKUP LANGUAGE, JAVASCRIPT, and other files, identifying interfaces to video source locations 40 and video target locations 50 may be performed by a combination of suitable parsing, scanning and other reverse engineering techniques. For example, interfaces to video source locations 40 may be file input elements present in the HYPERTEXT MARKUP LANGUAGE files, invocations to application programming interfaces of the application container 11 for retrieving or downloading input video files or streams from a video source location 40, which may be a remote World Wide Web server (such as the WORLD WIDE WEB CONSORTIUM XMLHTTPREQUEST, FILE, WEBSOCKET and other APIs). In turn, interfaces to video target locations 50 may for instance be HYPERTEXT MARKUP LANGUAGE elements for video playback inside the application container 11, JAVASCRIPT invocations of application programming model interfaces to store and upload data such as output video files or streams, etc. After identifying the existing interfaces of the external application 31 to video source locations 40 and video target locations 50, step 260 modifies and augments these interfaces with invocations of the embedded application interface 71. Specifically, the embedded application interface 71 may be invoked after the external application 31 receives an input video file or stream from a video source location 40 and before the external application 31 stores an output video file or stream to a video target location 50. Injecting the embeddable video capturing, processing, and conversion application 70 may be performed by dynamic code injection and interpretation techniques such as script injection and event coupling, where the embeddable video capturing, processing, and conversion application 70 code is triggered in response to an event being raised by the external application 31, in-place code modification where the code of the external application 31 is overwritten and changed in place, letting it perform invocations of the embedded application interface 71 of the embeddable video capturing, processing, and conversion application 70, late binding techniques where bindings to service invocations are set or updated at runtime. Application containers 11 being World Wide Web browsers often provide dedicated application programming interfaces for extensions such as the embeddable video capturing, processing, and conversion application 70, where the external application 31 that is presently run by the application container 11 can be inspected and influenced.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

The invention claimed is:
1. A method comprising:
receiving, at a client computing device from an application location, an external application;
receiving, at the client computing device from a code location, an embeddable video application including a processing component;
embedding the embeddable video application within the external application via the client computing device, said embedding including the external application configuring the embedded video application;

executing the external application within an application container of the client computing device with the embeddable video application embedded;

receiving an input video or audio at the application container from a video or audio source location;

processing the input video or audio via the processing component of the embeddable video application at the client computing device to generate processed video or audio; and forwarding the processed video or audio from the client computing device to a video or audio target location, wherein the external application comprises instructions to download and embed the embeddable video application within the external application at the client computing device by overwriting the code of the external application with the code of the embeddable video application to enable bindings to web service invocations.

2. The method of claim 1, wherein, configuring the embedded video application includes, selecting a subset of services to be provided by the embedded video application, or configuring an appearance and behavior of a user interface component of the embedded video application.

3. The method of claim 1, further comprising:

displaying, via the embeddable video application, an embedded application interface within the application container.

4. The method of claim 3, wherein the embedded application interface is integrated with a user interface of the external application.

5. The method of claim 4, wherein the input video or audio, and the video or audio source location, is selectable via the user interface of the external application or the embedded application interface.

6. The method of claim 3, wherein the embedded application interface comprises a button widget to execute one or more functions of the embeddable video application on the client computing device.

7. The method of claim 1, wherein the application container comprises a web browser.

8. The method of claim 1, wherein the external application is one of the following:

a web application; and an application.

9. The method of claim 1, wherein the external application is downloaded to the application location from an application outlet.

10. The method of claim 1, wherein the embeddable video application is one of the following:

a web browser extension; and a JavaScript library.

11. The method of claim 1, wherein processing the input video or audio includes performing one or more of the following via a processor of the client computing device:

transcoding the input video or audio; and editing the input video or audio.

12. The method of claim 11, wherein editing the input video or audio includes performing one or more of the following via a processor of the client computing device:

concatenating a plurality of input video or audio files;

applying visual and sound effects onto the input video or audio; and applying signal processing algorithms to process input video or audio.

13. The method of claim 1, wherein the input video or audio is a video or audio file, or a video or audio stream.

14. The method of claim 1, wherein the video or audio source location is one or more of the following:

a storage device;

a memory of the client computing device;

a cloud storage;

a camera; and a microphone.

15. The method of claim 1, wherein the video or audio target location is one or more of the following:

a memory of the client computing device; and a web service.

16. The method of claim 1, wherein the embeddable video application comprises one or more of hypertext markup language code, WebGL code, Google Portable Native Client code, and JavaScript code.

17. The method of claim 1, wherein at least a portion of the embeddable video application is cross-compiled from existing third-party source code.

* * * * *